(12) United States Patent
Sugaya et al.

(10) Patent No.: US 10,951,299 B2
(45) Date of Patent: Mar. 16, 2021

(54) WIRELESS DEVICE, COMMUNICATION DEVICE, WIRELESS CONTROL METHOD, COMMUNICATION CONTROL METHOD, AND PROGRAM

(71) Applicant: Sony Corporation, Tokyo (JP)

(72) Inventors: Shigeru Sugaya, Kanagawa (JP); Yusuke Tanake, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 278 days.

(21) Appl. No.: 16/304,137

(22) PCT Filed: Aug. 22, 2017

(86) PCT No.: PCT/JP2017/029872
§ 371 (c)(1),
(2) Date: Nov. 22, 2018

(87) PCT Pub. No.: WO2018/043195
PCT Pub. Date: Mar. 8, 2018

(65) Prior Publication Data
US 2020/0322033 A1 Oct. 8, 2020

(30) Foreign Application Priority Data

Sep. 5, 2016 (JP) ............................. JP2016-172716

(51) Int. Cl.
*H04B 7/06* (2006.01)
*H04L 1/18* (2006.01)
(Continued)

(52) U.S. Cl.
CPC ......... *H04B 7/0697* (2013.01); *H04L 1/0061* (2013.01); *H04L 1/188* (2013.01); *H04L 5/0044* (2013.01); *H04W 74/06* (2013.01)

(58) Field of Classification Search
CPC ..... H04B 7/0697; H04L 1/0061; H04L 1/188; H04L 5/0044; H04W 74/06
See application file for complete search history.

(56) References Cited

U.S. PATENT DOCUMENTS

2013/0051256 A1 2/2013 Ong et al.
2015/0124689 A1 5/2015 Merlin et al.
(Continued)

FOREIGN PATENT DOCUMENTS

CA  2 963 228 A1  4/2016
CN  104350799 A    2/2015
(Continued)

OTHER PUBLICATIONS

Park et al., "UL MU Transmission Rules—EDCA Backoff," Doc. IEEE 802.11-16/0880r2, pp. 1-21 (Jul. 26, 2016) (Year: 2016).*
(Continued)

*Primary Examiner* — Brian P Cox
(74) *Attorney, Agent, or Firm* — Xsensus LLP

(57) ABSTRACT

There is provided a wireless device configured to perform both multi-user spatial multiplex communication and single user communication with a communication device. The wireless device is configured to set a first waiting time for the single user communication, and count the first waiting time in a period in which a second waiting time for the multi-user spatial multiplex communication is counted. The wireless device then transmits data through the single user communication after the first waiting time expires.

9 Claims, 13 Drawing Sheets

(51) Int. Cl.
    *H04L 1/00*     (2006.01)
    *H04L 5/00*     (2006.01)
    *H04W 74/06*     (2009.01)

(56) References Cited

U.S. PATENT DOCUMENTS

| 2016/0105836 | A1 | 4/2016 | Seok |
| 2016/0113034 | A1 | 4/2016 | Seok |
| 2016/0128057 | A1 | 5/2016 | Seok |
| 2016/0198500 | A1* | 7/2016 | Merlin ................ H04W 76/11 370/329 |
| 2016/0219512 | A1 | 7/2016 | Asterjadhi et al. |

FOREIGN PATENT DOCUMENTS

| JP | 2007-235782 | A | 9/2007 |
| JP | 5437307 | B2 | 3/2014 |
| RU | 2 569 569 | C2 | 11/2015 |
| WO | 2015/194727 | A1 | 12/2015 |
| WO | 2016/105950 | A1 | 6/2016 |
| WO | 2016/112146 | A1 | 7/2016 |
| WO | 2016/130544 | A1 | 8/2016 |

OTHER PUBLICATIONS

Invitation to Respond to Written Opinion dated Mar. 24, 2020, issued in corresponding Singapore Patent Application No. 11201810144Y, 9 pages.

Park. J., et al., "UL MU Transmission Rules—EDCA Backoff," Doc. IEEE 802.11-1610880r2, pp. 1-21 (Jul. 26, 2016).

International Search Report and Written Opinion for International Application No. PCT/JP2017/029872, dated Dec. 14, 2017.

Jayh Park, UL MU Transmission Rules—EDCA backoff, IEEE 602.11-16/0880r2, Jul. 25, 2016.

International Preliminary Report on Patentability issued in International Application PCT/JP2017/029872 dated Dec. 6, 2018.

Russian Office Action dated Sep. 21, 2020, issued in corresponding Russian Patent Application No. 2019105430.

* cited by examiner

[Fig. 1]
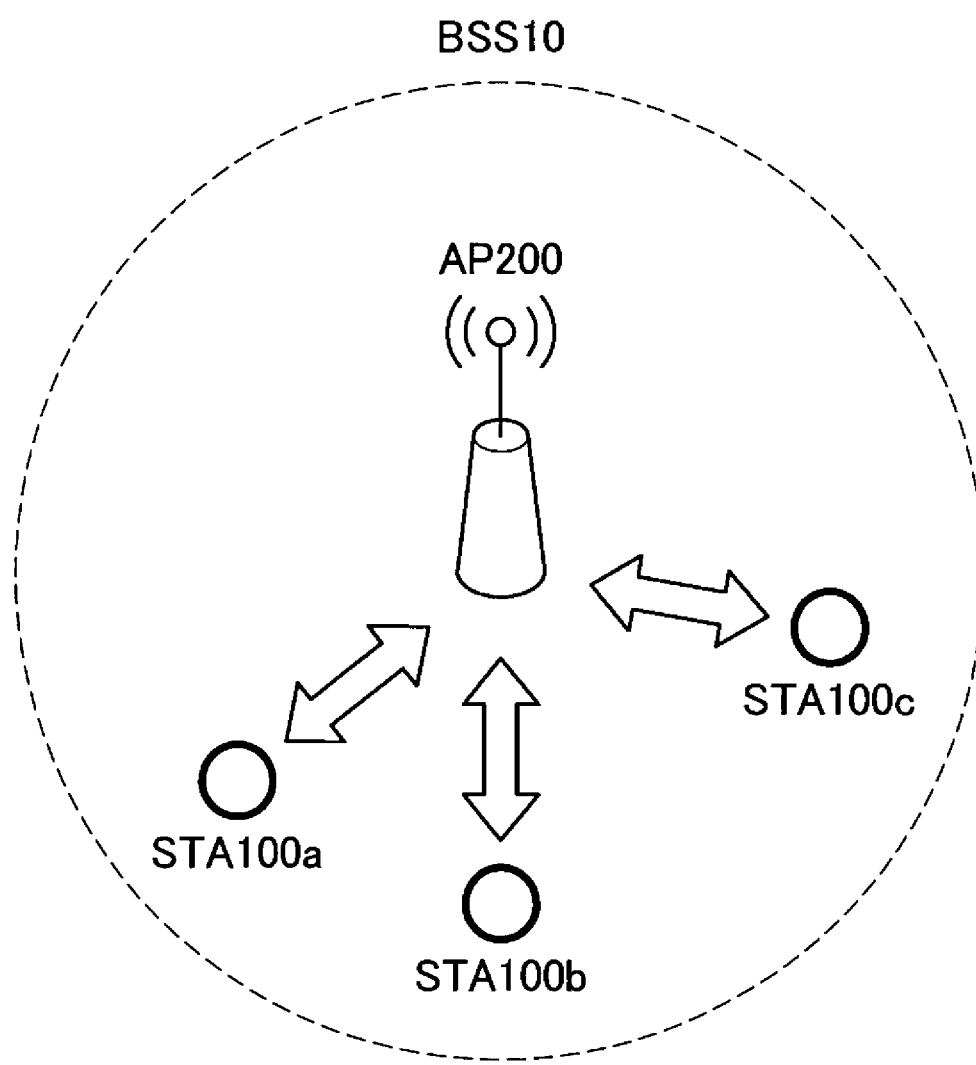

[Fig. 2]
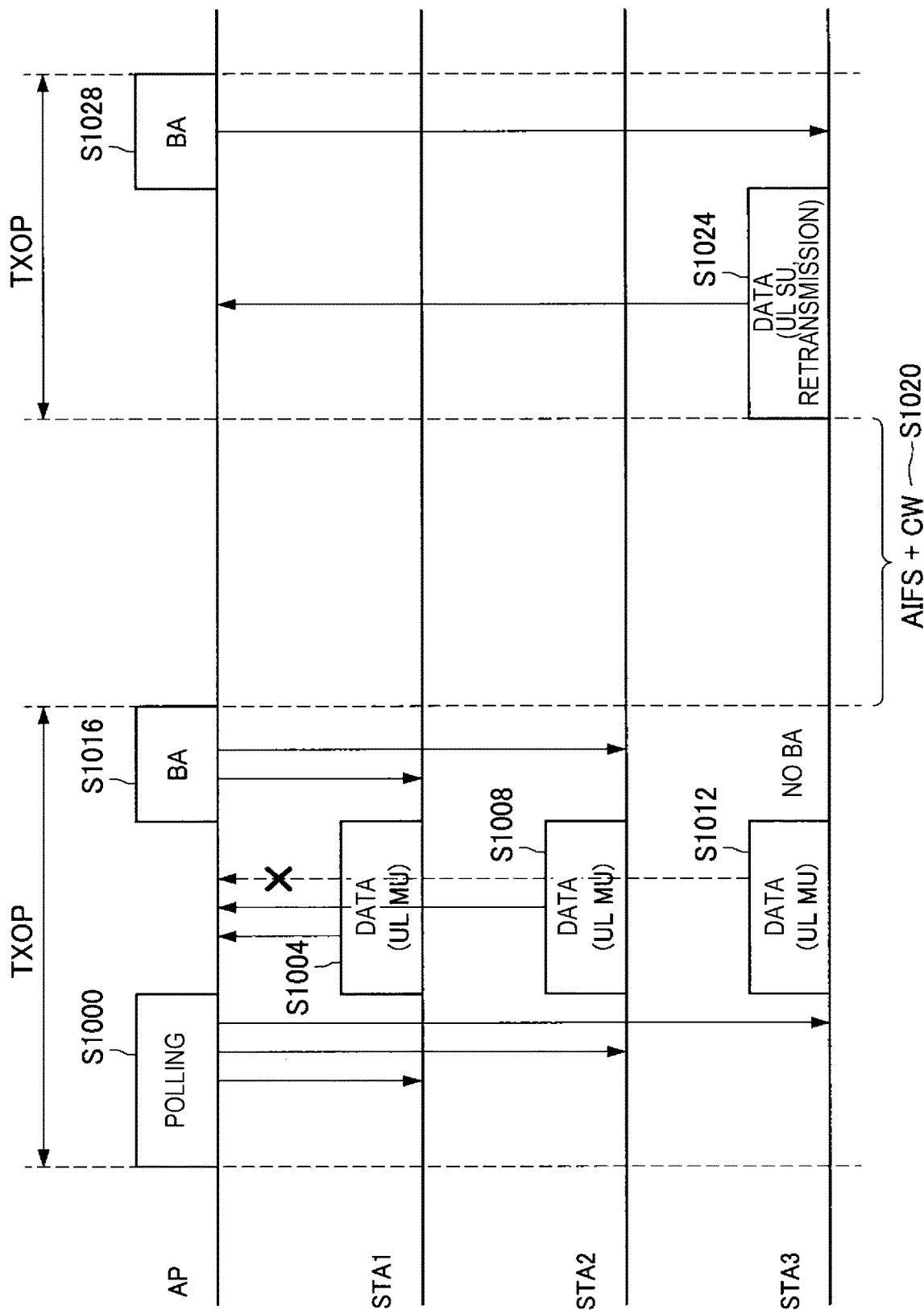

[Fig. 3]
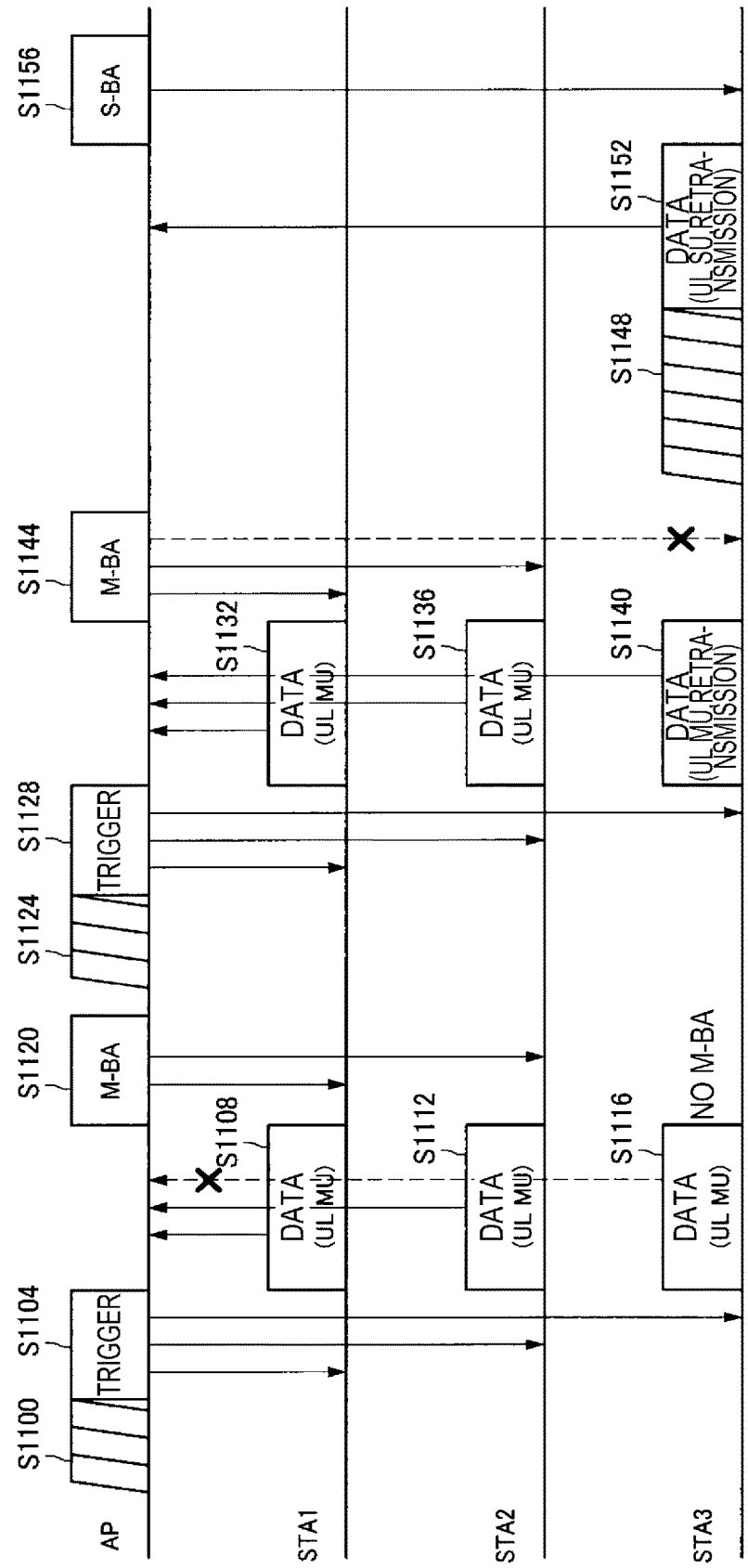

[Fig. 4]
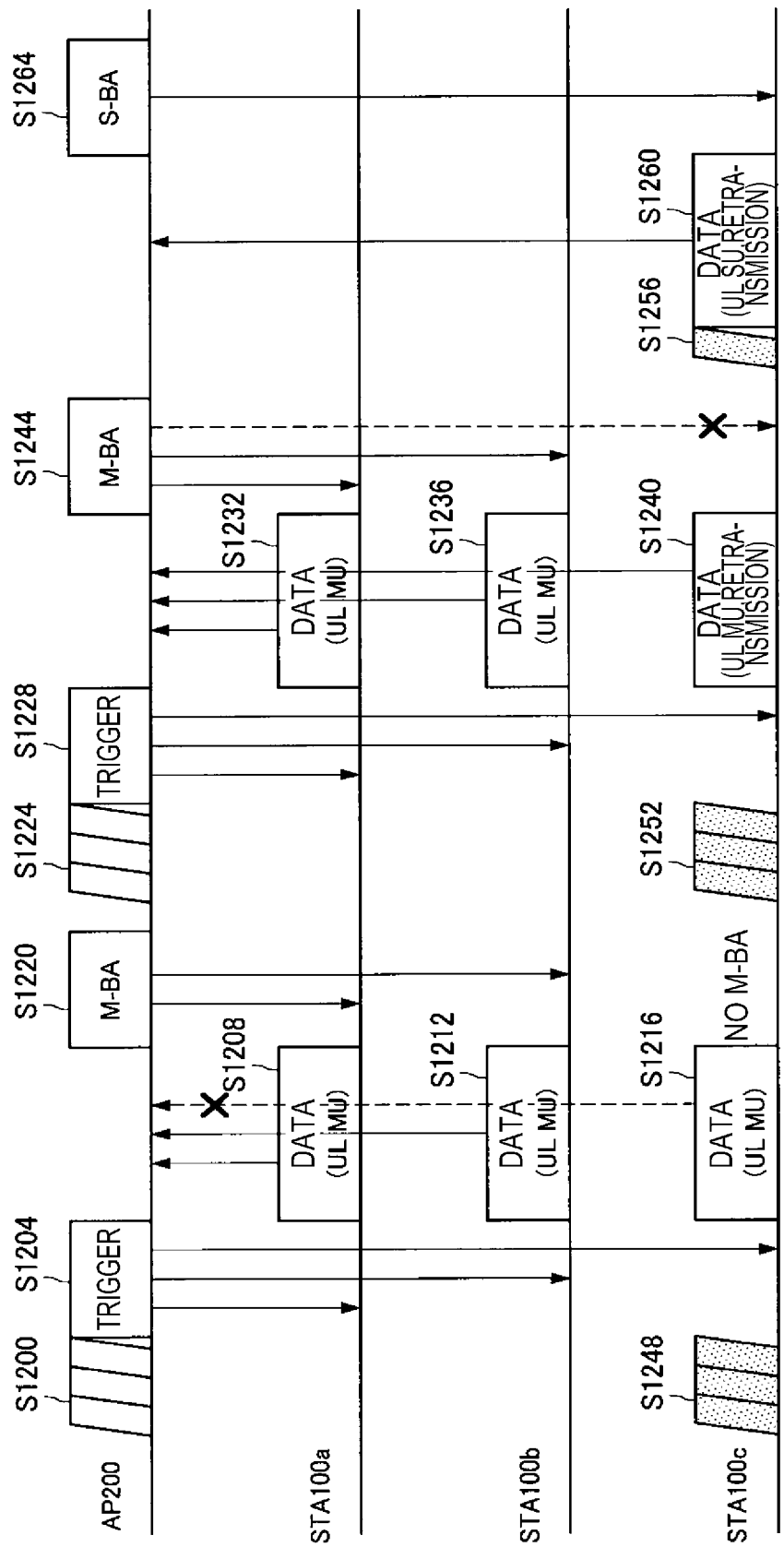

[Fig. 5]
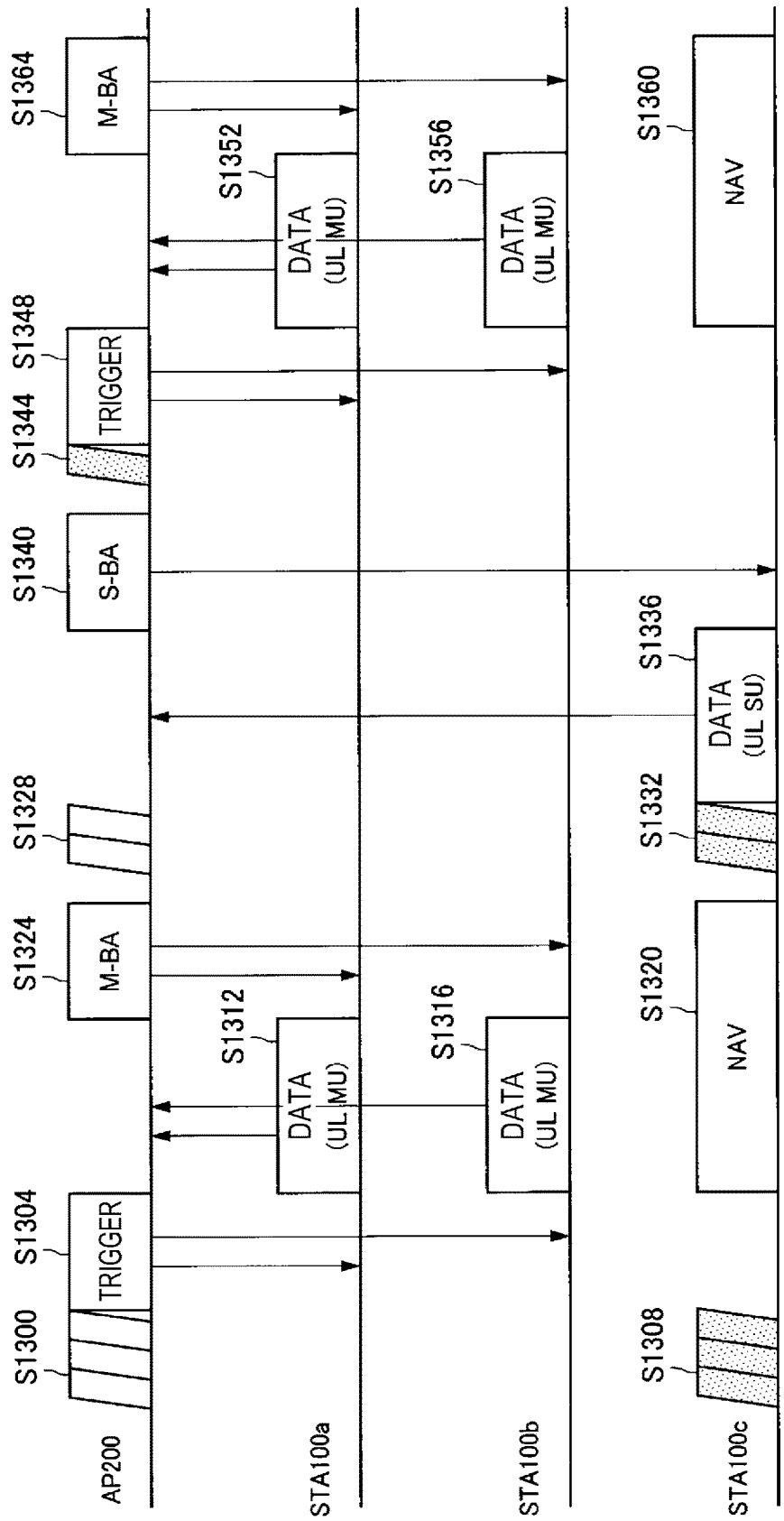

[Fig. 6]
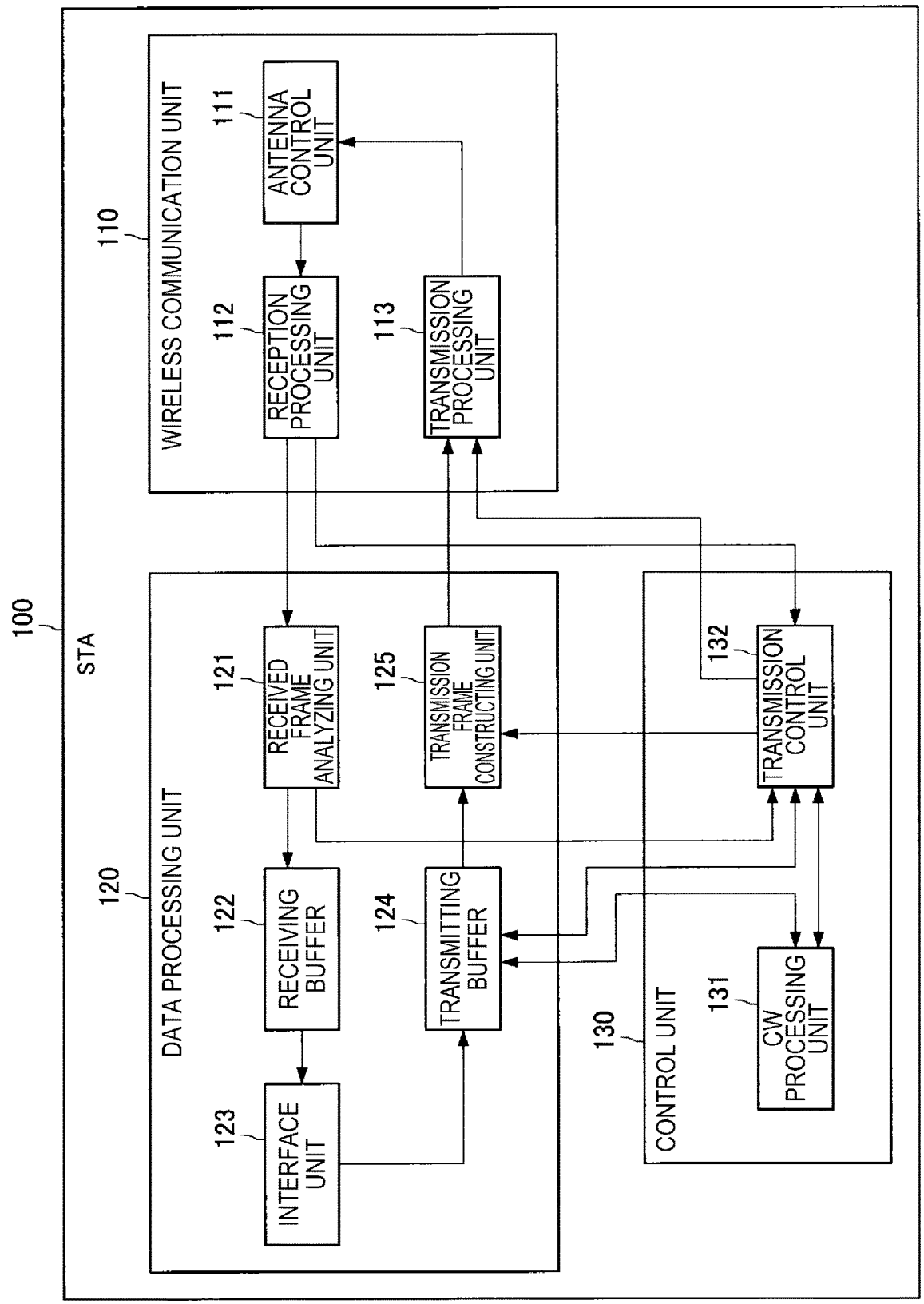

[Fig. 7]
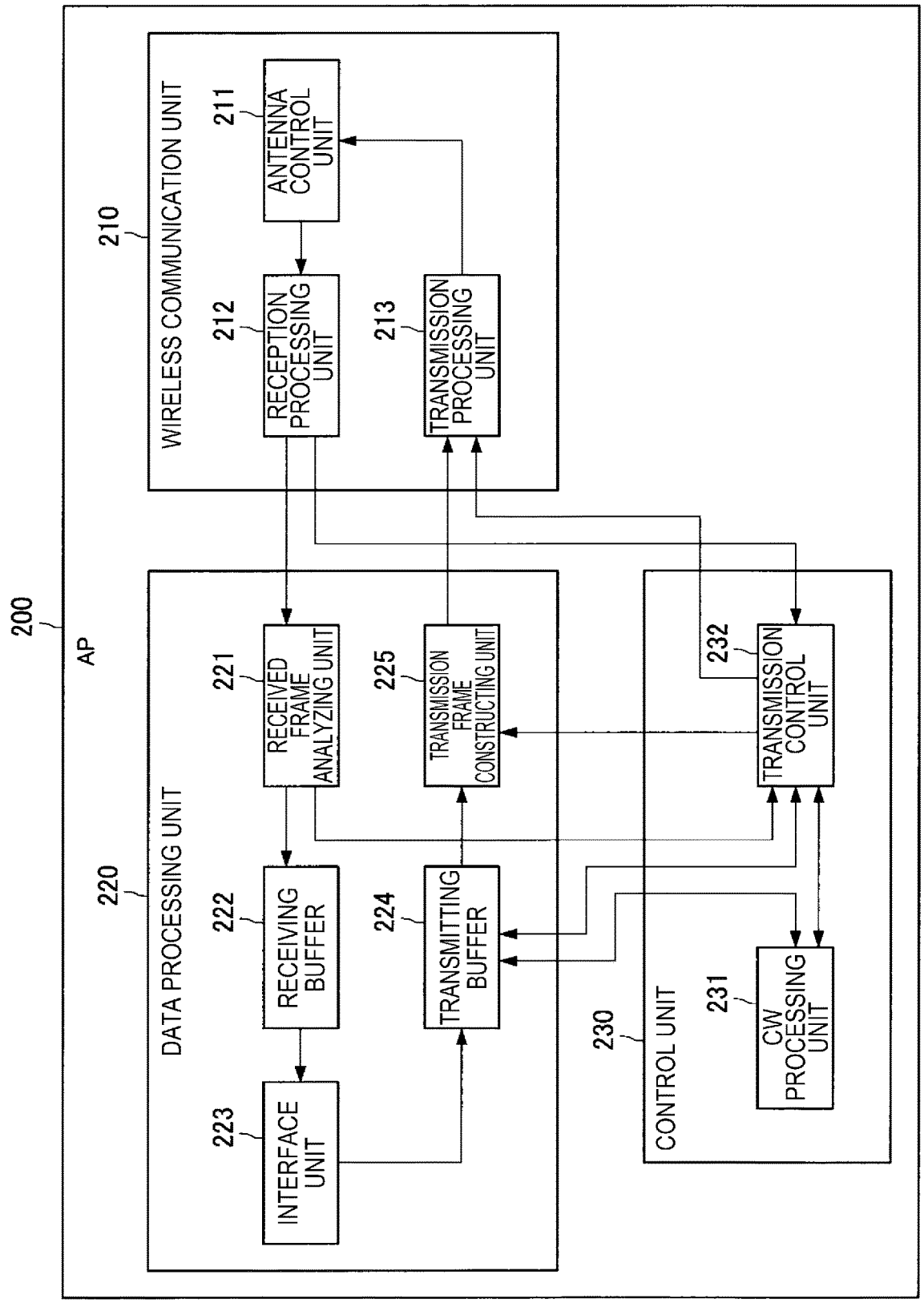

[Fig. 8]

| Priority | UP (Same as 802.1D user priority) | 802.1D designation | AC | Designation (informative) |
|---|---|---|---|---|
| Lowest → Highest | 1 | BK | AC_BK | Background |
| | 2 | – | AC_BK | Background |
| | 0 | BE | AC_BE | Best Effort |
| | 3 | EE | AC_BE | Best Effort |
| | 4 | CL | AC_VI | Video |
| | 5 | VI | AC_VI | Video |
| | 6 | VO | AC_VO | Voice |
| | 7 | NC | AC_VO | Voice |

[Fig. 9A]
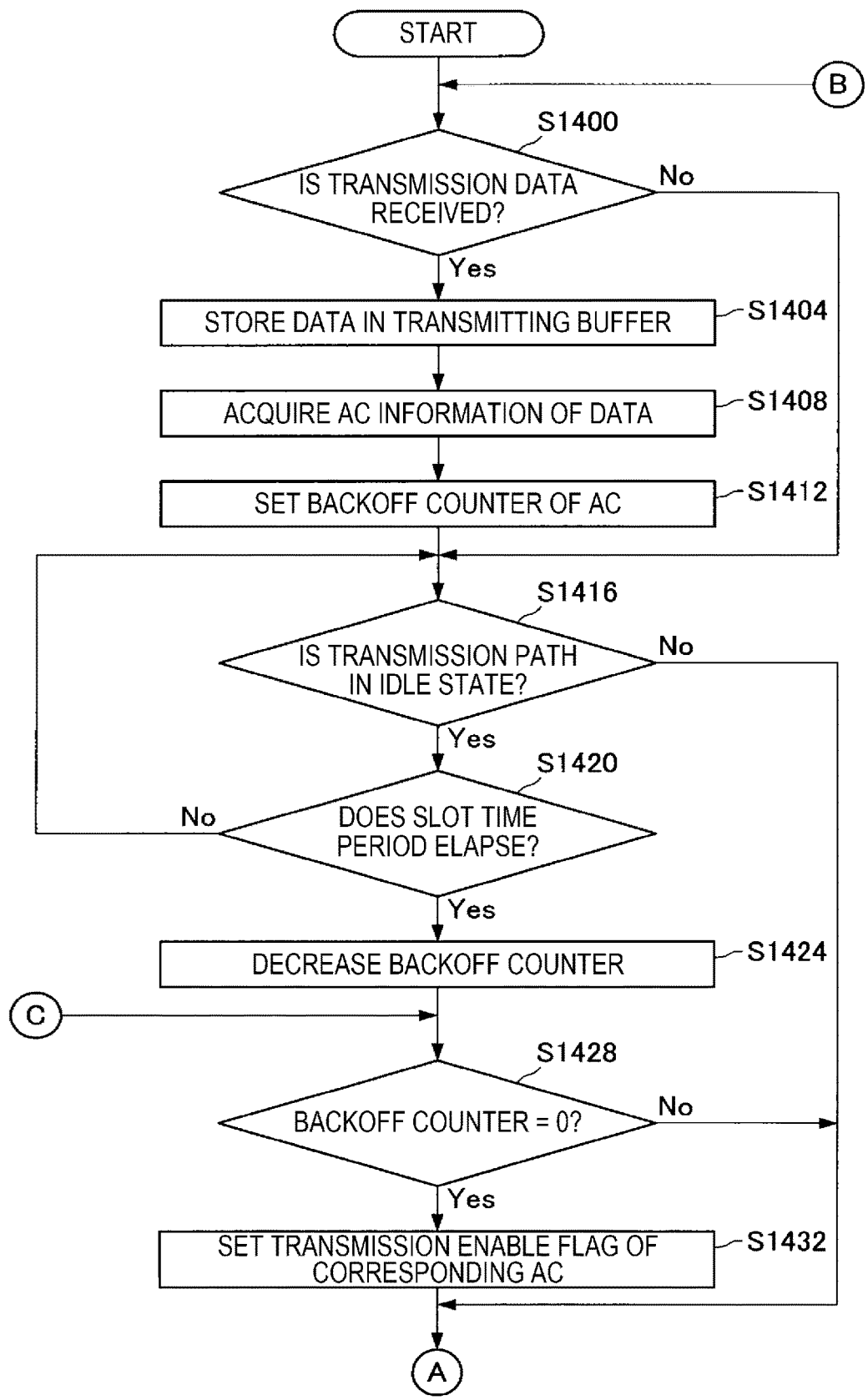

[Fig. 9B]
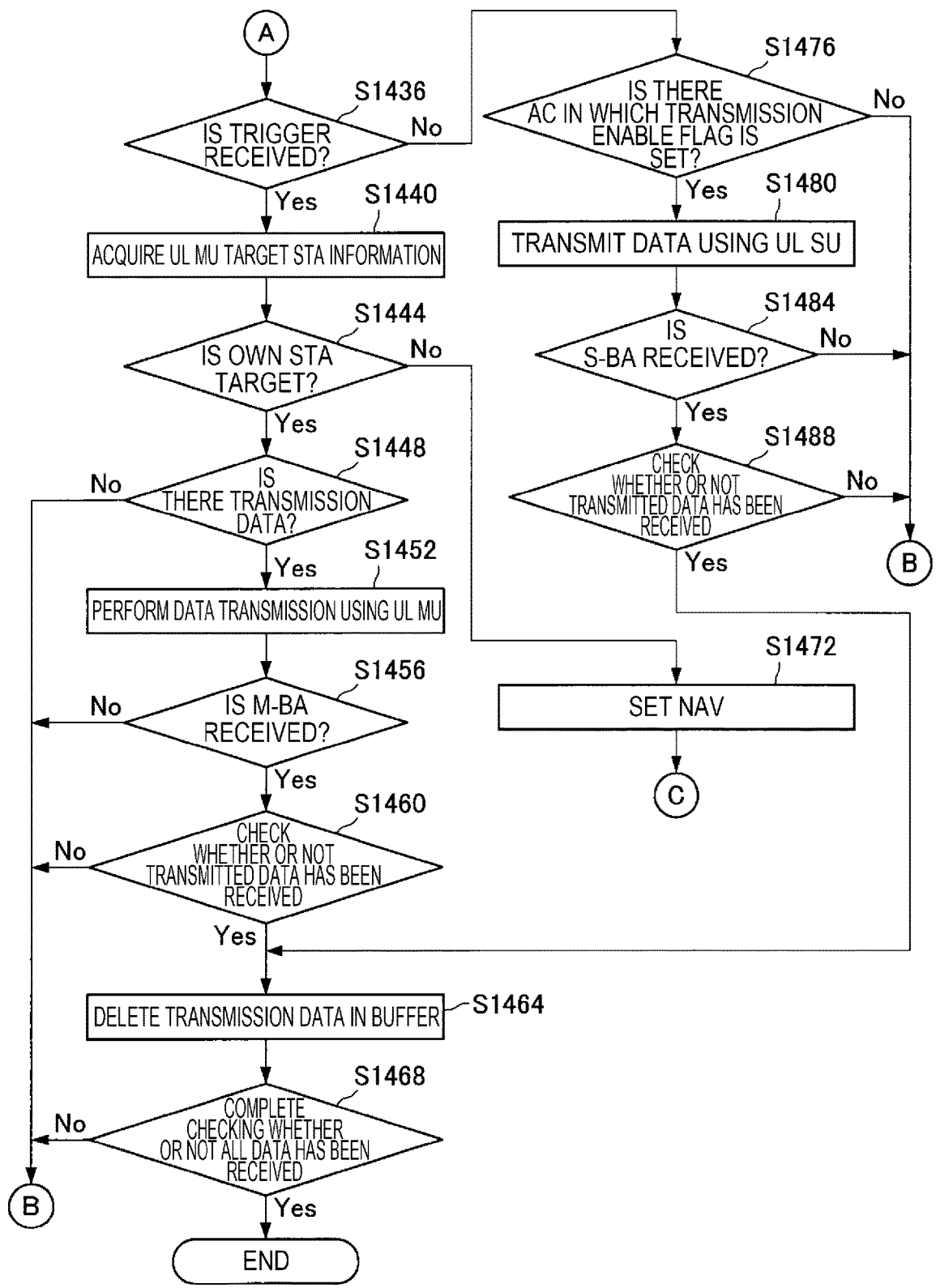

[Fig. 10]
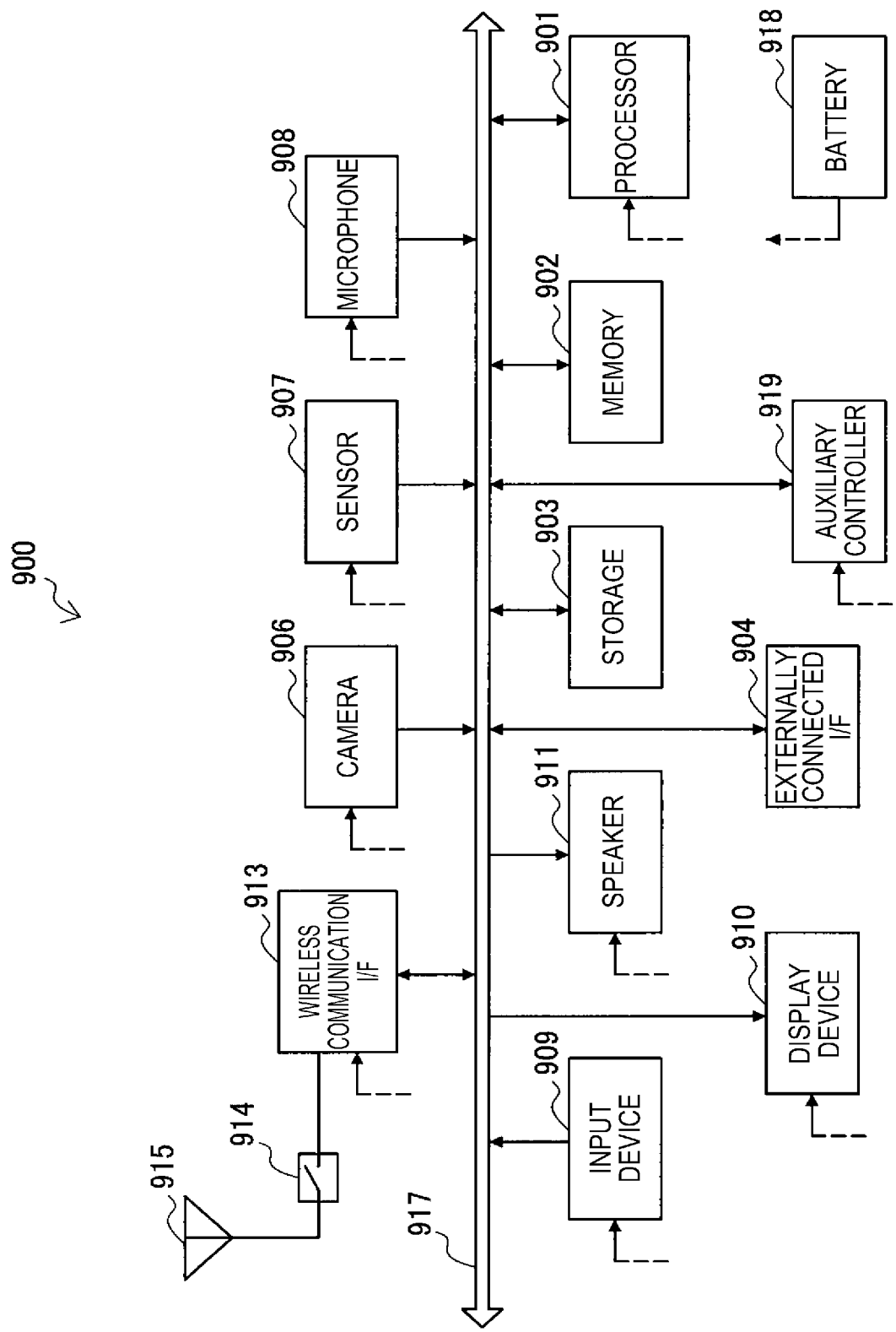

[Fig. 11]
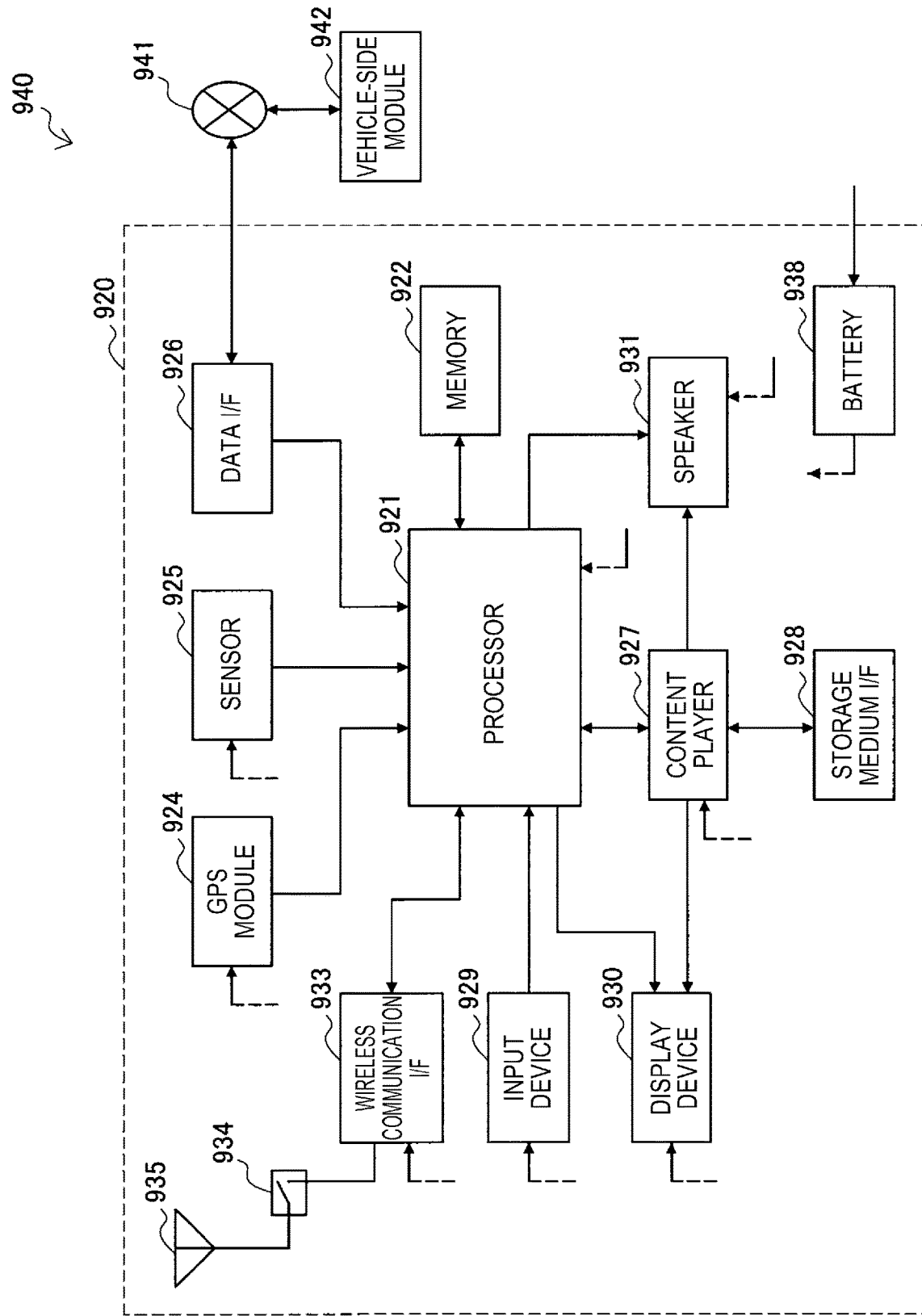

[Fig. 12]
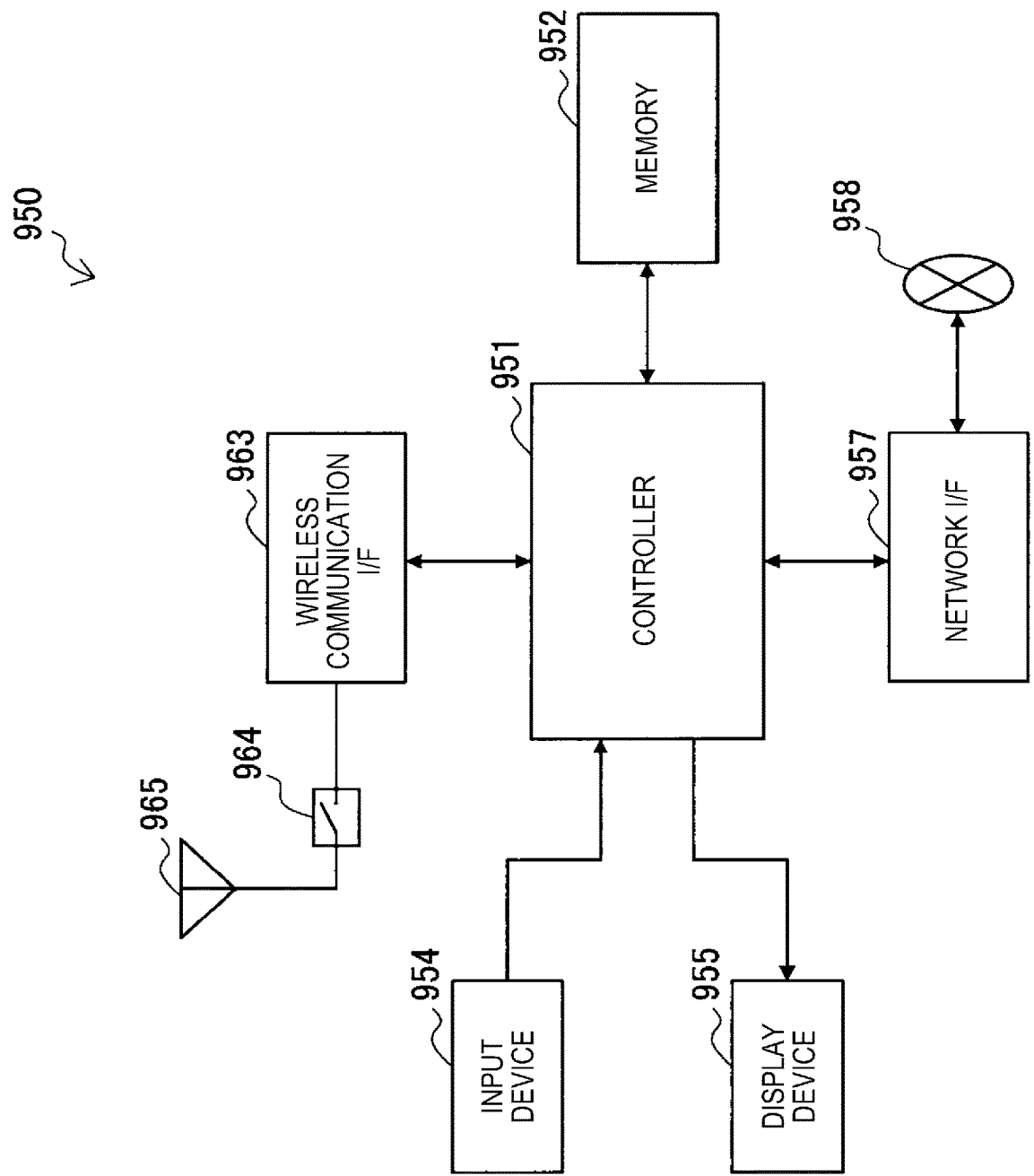

WIRELESS DEVICE, COMMUNICATION DEVICE, WIRELESS CONTROL METHOD, COMMUNICATION CONTROL METHOD, AND PROGRAM

CROSS-REFERENCE TO RELATED APPLICATIONS

This application is a National Stage Application based on PCT/JP2017/029872, filed Aug. 22, 2017, and claims the benefit of Japanese Priority Patent Application JP 2016-172716, filed Sep. 5, 2016, the entire contents of which are incorporated herein by reference.

TECHNICAL FIELD

The present disclosure relates to a wireless device, a communication device, a wireless control method, a communication control method, and a program.

BACKGROUND ART

In recent years, standardization of a new wireless LAN has been under review by IEEE 802.11 working groups and the like. For example, a method in which a plurality of wireless devices simultaneously perform data transmission with one access point device using multi-user spatial multiplex communication is under review. Patent Literature 1 discloses a communication control method in a wireless device that performs both multi-user spatial multiplex communication and single user communication.

CITATION LIST

Patent Literature

[PTL 1]
JP 5437307B

SUMMARY

Technical Problem

However, in the wireless LAN system, implementation of the single user communication is delayed due to influence of implementation of the multi-user spatial multiplex communication. For example, when an operation mode is switched from the multi-user spatial multiplex communication to the single user communication, an initial value of a waiting time for the single user communication is reset. For this reason, even when data with high priority is transmitted, a wireless device is on standby until the reset waiting time elapses and performs data transmission using the single user communication after the waiting time elapses.

In this regard, the present disclosure was made in light of the foregoing, and provides a wireless device, a communication device, a wireless control method, a communication control method, and a program, which are novel and improved and capable of preventing the implementation of the single user communication from being delayed due to the influence of the implementation of the multi-user spatial multiplex communication in the wireless device that performs both the multi-user spatial multiplex communication and the single user communication.

Solution to Problem

According to an embodiment of the present disclosure, there is provided a wireless device, including circuitry configured to perform multi-user spatial multiplex communication and single-user communication with a communication device; set a first waiting time for the multi-user spatial multiplex communication and a second waiting time for the single user communication; transmit data to the communication device by the multi-user spatial multiplex communication in accordance with the first waiting time; count the second waiting time in a period during which the first waiting time for the multi-user spatial multiplex communication is counted after transmission of the data; and retransmit the data to the communication device by single-user communication according to the second waiting time in a case it is determined that an error occurred during the transmission of the data by the multi-user spatial multiplex communication.

Further, according to an embodiment of the present disclosure, there is provided a method performed by a wireless device, the method including: performing multi-user spatial multiplex communication and single user communication with a communication device; setting a first waiting time for the multi-user spatial multiplex communication and a second waiting time for the single user communication; transmitting data to the communication device by the multi-user spatial multiplex communication in accordance with the first waiting time; counting the second waiting time in a period during which the first waiting time for the multi-user spatial multiplex communication is counted after transmission of the data; and retransmitting the data to the communication device by single-user communication according to the second waiting time in a case it is determined that an error occurred during the transmission of the data by the multi-used spatial multiplex communication.

Further, according to an embodiment of the present disclosure, there is provided a non-transitory computer-readable medium including computer-program instructions, which when executed by a wireless device, cause the wireless device to: perform multi-user spatial multiplex communication and single-user communication with a communication device; set a first waiting time for the multi-user spatial multiplex communication and a second waiting time for the single user communication; transmit data to the communication device by the multi-user spatial multiplex communication in accordance with the first waiting time; count the second waiting time in a period during which the first waiting time for the multi-user spatial multiplex communication is counted after transmission of the data; and retransmit the data to the communication device by single-user communication according to the second waiting time in a case it is determined that an error occurred during the transmission of the data by the multi-used spatial multiplex communication.

Further, according to an embodiment of the present disclosure, there is provided a communication device, including: circuitry configured to perform multi-user spatial multiplex communication and single user communication with a wireless device; set a first waiting time for the single user communication and a second waiting time for the multi-user spatial multiplex communication; count the second waiting time in a period in which a first waiting time for the single user communication is counted after performing single user communication with the wireless device; and transmit a trigger frame including permission information for the multi-user spatial multiplex communication to the wireless device after the second waiting time expires.

Further, according to an embodiment of the present disclosure, there is provided a method performed by a communication device, the method including: performing multi-user spatial multiplex communication and single user communication with a wireless device; setting a first waiting time for the single user communication and a second waiting time for the multi-user spatial multiplex communication; counting the second waiting time in a period in which a first waiting time for the single user communication is counted after performing single user communication with the wireless device; and transmitting a trigger frame including permission information for the multi-user spatial multiplex communication to the wireless device after the second waiting time expires.

Further, according to an embodiment of the present disclosure, there is provided a non-transitory computer-readable medium including computer-program instructions, which when executed by a wireless device, cause the wireless device to: perform multi-user spatial multiplex communication and single user communication with a wireless device; set a first waiting time for the single user communication and a second waiting time for the multi-user spatial multiplex communication: count the second waiting time in a period in which a first waiting time for the single user communication is counted after performing single user communication with the wireless device; and transmit a trigger frame including permission information for the multi-user spatial multiplex communication to the wireless device after the second waiting time expires.

Advantageous Effects of Invention

As described above, according to an embodiment of the present disclosure, it is possible to prevent the implementation of the single user communication from being delayed due to the influence of the implementation of the multi-user spatial multiplex communication in the wireless device that performs both the multi-user spatial multiplex communication and the single user communication.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram illustrating a configuration of a wireless LAN system according to an embodiment of the present disclosure.

FIG. 2 is a diagram illustrating communication between an AP and an STA in disclosure of a related art 1.

FIG. 3 is a diagram illustrating communication between an AP and an STA.

FIG. 4 is a diagram illustrating communication between an AP and an STA according to an embodiment of the present disclosure.

FIG. 5 is a diagram illustrating communication between an AP and an STA according to an embodiment of the present disclosure.

FIG. 6 is a diagram illustrating a configuration of an STA according to an embodiment of the present disclosure.

FIG. 7 is a diagram illustrating a configuration of an AP according to an embodiment of the present disclosure.

FIG. 8 is a diagram illustrating a type of AC and a priority of an AC.

FIG. 9A is a flowchart illustrating a data transmission operation by an STA.

FIG. 9B is a flowchart illustrating a data transmission operation by an STA.

FIG. 10 is a block diagram showing an example of a schematic configuration of a smartphone.

FIG. 11 is a block diagram showing an example of a schematic configuration of a car navigation apparatus.

FIG. 12 is a block diagram showing an example of a schematic configuration of a wireless access point.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Overview of wireless LAN system
2. Configurations of devices
3. Operations of devices
4. Application examples
5. Conclusion 1. Overview of Wireless LAN System An embodiment of the present disclosure relates to a wireless LAN system. First, an overview of a wireless LAN system according to an embodiment of the present disclosure will be described with reference to FIG. 1.

1-1. Configuration of Wireless LAN System

FIG. 1 is a diagram illustrating a configuration of the wireless LAN system according to an embodiment of the present disclosure. As illustrated in FIG. 1, the wireless LAN system according to an embodiment of the present disclosure includes an access point device (hereinafter referred to as an "access point (AP)" for convenience) 200 and a station device (hereinafter referred to as a "station (STA)" for convenience) 100. A basic service set (hereinafter referred to as a "BSS" for convenience) 10 is configured with one AP 200 and one or more STAs 100.

The wireless LAN system according to an embodiment of the present disclosure can be installed in any place. For example, the wireless LAN system according to the present embodiment may be installed in an office building, a residential area, a commercial facility, a public facility, or the like. The BSS 10 may be arranged so that an area of the BSS 10 overlaps areas of other BSSs 10.

The AP 200 according to the present embodiment functions as a communication device, is connected to an external network, and provides the STA 100 with communication with an external network. For example, the AP 200 is connected to the Internet and provides communication between the STA 100 and a device on the Internet or a device connected via the Internet.

Further, the AP 200 receives data using uplink multicast-user spatial multiplex communication (hereinafter referred to as "uplink multi-user (UL MU)" for convenience) or uplink single user communication (hereinafter referred to as "uplink single-user (UL SL)" for convenience).

To describe data reception using the UL MU in more detail, the AP 200 decides the STA 100 that executes the UL MU. Thereafter, the AP 200 generates a trigger frame (hereinafter referred to as "trigger" for convenience) including information related to the STA 100 which is permitted to perform the UL MU, information related to a period of time in which data transmission using the UL MU is performed, and the like (hereinafter referred to as "UL MU permission information" for convenience). Then, the AP 200 sets the waiting time before trigger transmission, and transmits the trigger to the STA 100 after the waiting time elapses, so that the STA 100 is allowed to perform the UL MU. The data reception by the AP 200 using the UL MU or the UL SU will be described later in detail.

The STA 100 according to the present embodiment is a wireless device that functions as a wireless device and communicates with the AP 200. The STA 100 may be any wireless device. For example, the STA 100 may be a smartphone including a display having a display function, a memory having a storage function, a keyboard and a mouse having an input function, a speaker having an audio output function, and a function of executing an advanced calculation process.

The STA 100 according to the present embodiment performs data transmission to the AP 200 using the UL MU or the UL SU. To describe the data transmission using the UL MU specifically, the STA 100 receives the trigger from the AP 200, and when its own STA 100 is included in the UL MU permission information included in the trigger, the STA 100 performs the data transmission to the AP 200 using the UL MU. In other words, the data transmission is performed to the AP 200 together with the STA 100 that is permitted to perform the UL MU other than its own STA. The data transmission by the STA 100 using the UL MU will be described later in detail.

Further, to describe the data transmission using the UL SU specifically, the STA 100 sets the waiting time before the UL SU on the basis of a priority of the transmission data, and after the waiting time has elapsed, the STA 100 performs the data transmission to the AP 200 using the UL SU. In other words, the STA 100 can perform the data transmission to the AP 200 using the UL SU without receiving the trigger of the UL MU. The data transmission by the STA 100 using the UL SU will be described later in detail.

1-2. Background

In recent years, standardization of a new wireless LAN has been under review by IEEE 802.11 working groups and the like. Such review has included review for improving a communication control method using the UL MU and the UL SU in a method of a related art while securing compatibility with the method of the related art.

As the communication control method using the UL MU and the UL SU, for example, there is a disclosure of the related art 1. In this regard, content of the disclosure of the related art 1 will be described with reference to FIG. 2. FIG. 2 is a diagram illustrating communication between an AP and an STA in the disclosure of the related art 1. As illustrated in FIG. 2, for example, there is a wireless LAN system including one AP and three STAs (STAs 1 to 3).

First, in step S1000, the AP transmits a polling frame including information related to permission of the UL MU to each of the STAs. Here, the information related to the permission of the UL MU included in the polling refers to information related to an STA which executes the UL MU, a period of time for performing the UL MU (transmission opportunity (TXOP)), and the like. Each STA receives the polling frame, and checks the information related to the permission of the UL MU included in the polling frame. In steps S1004 to S1012, each STA transmits the data transmission to the AP using the UL MU during the period of time of the TXOP designated by the polling when its own STA is included as the STA that is permitted to perform the UL MU.

Thus, in the disclosure of the related art 1, the data transmission by each STA is controlled by the polling transmitted from the AP. Therefore, the STA is unable to perform random access control in accordance with the priority of the transmission data. In the disclosure of related art 1, in order to enable the transmission control according to the priority of the transmission data held in the STA, it is necessary for the AP to detect the priority of the transmission data held in the STA in advance, but it is not easy to realize this.

Further, immediately after the TXOP ends, when the AP transmits the polling and sets a new TXOP, the STA has no opportunity to autonomously perform the data transmission. Therefore, the feasibility of the data transmission according to the priority of transmission data by STA is further lowered.

Next, the background of the present disclosure from another point of view will be described. In FIG. 2, it is assumed that the data transmitted by the STA 3 in step S1012 is not received by the AP for some reason. In step S1016, the AP that has received the data transmitted by STA1 and STA2 generates a Block-ACK frame (hereinafter referred to as a "BA" for convenience) and transmits the BA to the respective STAs. The BA is a response frame including information related to a reception state of the frame transmitted by each STA. Since information indicating that the data transmitted by the STA 1 and the STA 2 has been received by the AP is included in the BA, the STA 1 and the STA 2 that have received the BA can detect that the transmission data has been properly received by the AP.

On the other hand, since the BA does not include information indicating that the data transmitted by the STA 3 has been received by the AP, the STA 3 that has received the BA determines that the transmission data has not been correctly received by the AP, and attempts to retransmit the transmission data. At that time, in step S1020, the STA 3 resets a contention window (hereinafter referred to as a "CW" for convenience) and resets a backoff counter on the basis of the CW. Therefore, the STA 3 retransmits the data using the UL SU after an arbitration inter frame space (hereinafter referred to as an "AIFS" for convenience) elapses, and the reset backoff counter becomes 0.

As described above, in the disclosure of related art 1, since the CW and the backoff counter are reset for the data transmission by the UL SU, the data transmission by the UL SU may be delayed from a desired timing. In this case, when the priority of the transmission data is high such as when the transmission data is audio data, the transmission data is significantly influenced.

Next, the background of the present disclosure will be described with reference to FIG. 3. FIG. 3 is a diagram illustrating communication between the AP and the STA.

As illustrated in FIG. 3, after the backoff counter set on the basis of the CW corresponding to three slots becomes 0 in step S1100, in step S1104, the AP transmits the trigger including the information related to the permission of the UL MU to each STA. Each STA receives the trigger and checks the information related to the permission of the UL MU included in the trigger. In steps S1108 to S1116, each STA performs the data transmission to the AP using the UL MU during a period of time designated by the trigger when its own STA is included as the STA that is permitted to perform the UL MU.

In FIG. 3, it is assumed that the data transmitted by the STA 3 is not received by the AP for some reason. In step S1120, the AP that has received the data transmitted by the STA 1 and the STA 2 generates a Multi-Block-ACK frame (hereinafter referred to as an "M-BA" for convenience) and transmits the M-BA to each STA. The M-BA is a response frame including information related to a reception state of the frame transmitted from each STA using the UL MU.

Since the information indicating that the data transmitted by the STA 1 and the STA 2 has been received by the AP is included in the M-BA, the STA 1 and the STA 2 that have received the M-BA can detect that the transmission data has been properly received by the AP. On the other hand, since the M-BA does not include information indicating that the data transmitted by the STA 3 has been received by the AP, the STA 3 that has received the M-BA can detect that the transmission data has not been correctly received by the AP.

After the backoff counter set on the basis of the CW corresponding to three slots becomes 0 in step S1124, in step S1128, the AP retransmits the trigger to each STA. In steps S1132 to S1140, each STA performs the data transmission to the AP using the UL MU during the period of time designated by the trigger when its own STA is included in the STA that is permitted to perform the UL MU. At this time, since the STA 3 detects that the previous transmission data has not been correctly received by the AP, the STA 3 retransmits the previous transmission data.

In step S1144, the AP that has received the data transmitted by the STAs 1 to 3 generates the M-BA and transmits the M-BA to each STA. In FIG. 3, it is assumed that the M-BA has not been received by the STA 3 for some reason. When the M-BA is unable to be received during a standby time for reception of the M-BA, the STA 3 determines that the transmission data has not been correctly received by the AP and attempts to retransmit the transmission data.

In step S1148, the STA 3 resets the CW (the CW is reset to a CW corresponding to six slots in FIG. 3), and resets the backoff counter on the basis of the CW. Then, after the IFS elapses and the re-set backoff counter becomes 0, in step S1152 the STA 3 retransmits the data using the UL SU. When the data transmitted using the UL SU is correctly received by the AP, the AP generates a Single-Block-ACK frame (hereinafter referred to as an "S-BA" for convenience) and transmits the S-BA to the STA 3. The S-BA is a response frame including information related to a reception state of the frame transmitted from each STA using the UL SU. Since information indicating that the data transmitted by the STA 3 has been received by the AP is included in the S-BA, the STA 3 that has received the S-BA can detect that the transmission data has been correctly received by the AP.

As described above, even in the method of FIG. 3, the CW is reset for the data transmission using the UL SU, and the backoff counter is also reset on the basis of the CW, similarly to the disclosure of related art 1, and thus the data transmission by the UL SU may be delayed from a desired timing.

In this regard, the disclosures of the present case have devised the present disclosure in view of the above circumstances. An STA 100 of the wireless LAN system according to an embodiment of the present disclosure can perform the data transmission according to the priority of the transmission data using the UL SU regardless of the UL MU. In addition, the STA 100 does not reset the backoff counter when the data transmission using the UL SU is performed after the UL MU, and thus it is possible to prevent the data transmission from being delayed due to the resetting of the backoff counter. In other words, the STA 100 can prevent the implementation of the UL SU from being delayed due to the implementation of the UL MU. The STA 100 and the AP 200 according to the present embodiment have compatibility with the STA and the AP employing the method of the related art. For example, the STA 100 and the AP 200 according to the present embodiment can correctly communicate with both the STA and the AP that perform random access control based on CSMA/CA using the method of the related art.

1-3. Function Overview of Wireless LAN System

The background of the present disclosure has been described above. Next, a function overview of the wireless LAN system according to an embodiment of the present disclosure will be described with reference to FIGS. 4 and 5. FIGS. 4 and 5 are diagrams illustrating communication between the AP 200 and the STA 100 according to the present embodiment.

Steps S1200 to S1244 in FIG. 4 are the same as the steps S1100 to S1144 in FIG. 3, and thus description thereof is omitted. In steps S1248 and S1252, an STA 100c according to the present embodiment decreases a UL SU backoff counter during a period in which the AP 200 decreases a UL MU backoff counter in steps S1200 and S1224.

Here, the backoff counter is set in accordance with the priority which is decided in accordance with an access category of transmission data (hereinafter referred to as an "access category (AC)" for convenience). Specifically, as the priority decided in accordance with the AC of the transmission data increases, the backoff counter decreases. In other words, as the priority of transmission data increases, the waiting time of the data transmission using the UL SU decreases. Further, when the trigger transmitted from the AP 200 is received, the STA 100c suspends the decreasing of the UL SU backoff counter.

When the M-BA is unable to be received in step S1244, the STA 100c determines that the transmission data has not been correctly received by the AP 200 and attempts to retransmit the transmission data. In this case, in step S1256, the STA 100c continues to decrease the backoff counter that has already been decreased without resetting the CW and the backoff counter. Then, after the UL SU backoff counter becomes 0, in step S1260, the STA 100c retransmits the data using the UL SU. Although not illustrated, when the UL SU backoff counter becomes 0 before the trigger transmission by the AP 200, the STA 100c performs the data transmission to the AP 200 using the UL SU before the trigger transmission by the AP 200.

As described above, the STA 100 of the wireless LAN system according to the present embodiment can perform the data transmission according to the priority of the transmission data using the UL SU regardless of the UL MU. Further, since the STA 100 does not reset the backoff counter when the data transmission using the UL SU is performed after the UL MU, it is possible to prevent the data transmission from being delayed due to the resetting of the backoff counter. In other words, the STA 100 can prevent the implementation of the UL SU from being delayed due to the implementation of the UL MU. The STA 100 and the AP 200 according to the present embodiment have compatibility with the STA and the AP employing the method of the related art. For example, the STA 100 and the AP 200 according to the present embodiment can correctly communicate with both the STA and the AP that perform random access control based on CSMA/CA using the method of the related art.

Next, communication between the AP 200 and the STA 100 in a case different from that in FIG. 4 will be described with reference to FIG. 5. FIG. 5 is a diagram illustrating an operation in which the STA 100c performs the UL SU when the STA 100c is not included as the STA 100 that is permitted to perform the UL MU.

As illustrated in FIG. 5, in step S1300, the AP 200 decreases the backoff counter set based on the CW corresponding to three slots. Then, similarly to FIG. 4, in step S1308, the STA 100c decreases the UL SU backoff counter during a period in which the UL MU backoff counter is decreased by the AP 200.

After the UL MU backoff counter becomes 0, in step S1304, the AP 200 transmits the trigger including the UL MU permission information to each STA 100. Each STA 100 receives the trigger, and checks the UL MU permission information included in the trigger. In steps S1312 to S1316, an STA 100a and an STA 100b check that they, the STAs, themselves are included as the STA 100 that is permitted to perform the UL MU, and perform the data transmission to the AP 200 using the UL MU during a period of time designated by the trigger.

In step S1320, the STA 100c suspends the decreasing of the UL SU backoff counter at a timing at which the trigger is detected, checks that it, the STA, itself is not included as the STA 100 that is allowed to perform the UL MU, and sets a transmission prohibition period (hereinafter referred to as a "network allocation vector (NAV)" for convenience). The STA 100c is unable to transmit a signal during a period in which the NAV is set.

In step S1324, the AP 200 that has received the data transmitted by the STA 100a and the STA 100b generates the M-BA and transmits the M-BA to each STA 100. Thereafter, in step S1328, the AP 200 starts to decrease the UL MU backoff counter. The STA 100c that has received the M-BA detects that the UL MU has been completed and cancels the NAV. Then, in step S1332, the STA 100c restarts decrease of the UL SU backoff counter which has been suspended.

Then, after the UL SU backoff counter becomes 0, in step S1336, the STA 100c performs the data transmission to the AP 200 using the UL SU. Upon receiving the data transmitted by the SA 100c, the AP 200 suspends the decreasing of the UL MU backoff counter. Then, when the data transmitted using the UL SU is correctly received by the AP 200, the AP 200 transmits the S-BA to the STA 100. Thereafter, in step S1344, the AP 200 restarts the decreasing of the UL MU backoff counter that has been suspended. Steps S1344 to S1364 are the same as the steps S1304 to S1324, and thus description thereof is omitted.

As described above, the STA 100 according to the present embodiment can perform the data transmission according to the priority of the transmission data using the UL SU regardless of the UL MU. In other words, the STA 100 can prevent the implementation of the UL SU from being delayed due to the implementation of the UL MU. The STA 100 and the AP 200 according to the present embodiment have compatibility with the STA and the AP employing the method of the related art. For example, the STA 100 and the AP 200 according to the present embodiment can correctly communicate with both the STA and the AP that perform random access control based on CSMA/CA using the method of the related art.

2. Configurations of Devices 2-1. Structure of STA

The function overview of the wireless LAN system according to an embodiment of the present disclosure has been described above. Next, a configuration of the STA 100 according to the present embodiment will be described with reference to FIG. 6.

FIG. 6 is a diagram illustrating a configuration of the STA 100 according to an embodiment of the present disclosure. As illustrated in FIG. 6, the STA 100 includes a wireless communication unit 110, a data processing unit 120, and a control unit 130.

(Wireless Communication Unit)

As illustrated in FIG. 6, the wireless communication unit 110 includes an antenna control unit 111, a reception processing unit 112, and a transmission processing unit 113. The wireless communication unit 110 functions as a communication unit.

The antenna control unit 111 controls transmission and reception of a signal via at least one antenna. More specifically, the antenna control unit 111 provides a signal received via the antenna to the reception processing unit 112, and transmits a signal generated by the transmission processing unit 113 via the antenna.

The reception processing unit 112 performs a reception process on frames on the basis of the signal provided from the antenna control unit 111. For example, the reception processing unit 112 performs an analog process and down-conversion on the signal obtained from the antenna, and outputs a baseband reception signal. Then, the reception processing unit 112 calculates a correlation between one or two or more signal patterns and the reception signal while shifting the reception signal to be operated on a time axis, and detects a preamble on the basis of the appearance of a correlation peak. Accordingly, the reception processing unit 112 can detect the trigger, the M-BA, the S-BA, the data frame, and the like which are transmitted by the AP 200. Further, the reception processing unit 112 acquires the frames by performing demodulation, decoding, and the like on the baseband reception signal, and provides the acquired frames to a received frame analyzing unit 121. Further, the reception processing unit 112 provides information related to the success or failure of the frame acquisition to a transmission control unit 132.

The transmission processing unit 113 performs a process of transmitting the frame provided from a transmission frame constructing unit 125. More specifically, the transmission processing unit 113 generates a signal to be transmitted on the basis of the frame provided from the transmission frame constructing unit 125 and a parameter set according to an instruction given from the transmission control unit 132. For example, the transmission processing unit 113 generates a baseband transmission signal by performing encoding, interleaving, and modulation on the frame provided from the transmission frame constructing unit 125 in accordance with a coding and modulation scheme or the like instructed by the transmission control unit 132. Further, the transmission processing unit 113 upconverts the baseband transmission signal obtained through the process of a preceding stage.

(Data Processing Unit)

As illustrated in FIG. 6, the data processing unit 120 includes the received frame analyzing unit 121, a receiving buffer 122, an interface unit 123, a transmitting buffer 124, and a transmission frame constructing unit 125.

The received frame analyzing unit 121 analyzes a received frame. More specifically, the received frame analyzing unit 121 acquires a type (the trigger, the M-BA, the S-BA, the data frame, or the like), a destination, and a transmission source of a frame received by the wireless communication unit 110 and data or control information included in the frame. For example, the received frame analyzing unit 121 acquires data or the like included in the received frame by performing analysis of a header, detection and correction of a code error, a reordering process, and the like on the received frame.

Further, when the trigger transmitted by the AP 200 is received, the received frame analyzing unit 121 acquires the UL MU permission information included in the trigger. Then, when its own STA is included as the STA 100 that is permitted to perform the UL MU, the received frame analyzing unit 121 provides information indicating that its own STA is included as the STA 100 that is permitted to perform the UL MU and information used for implementation of the UL MU (a period of time in which the data transmission using the UL MU is performed, information related to a frame length in the UL MU, or the like) to the transmission control unit 132. Further, when the M-BA or the S-BA transmitted by the AP 200 is received, the received frame analyzing unit 121 acquires transmission data reception result information included in the M-BA or the S-BA, and transmits the information to the transmission control unit 132.

The receiving buffer 122 stores received data. More specifically, the receiving buffer 122 stores data included in the received frame.

The interface unit 123 is an interface that is connected with other components installed in the STA 100. More specifically, the interface unit 123 performs reception of data that is desired to be transmitted from the other components, for example, an application, a user interface, provision of received data to an application or a user interface, or the like.

The transmitting buffer 124 stores transmission data. More specifically, the transmitting buffer 124 stores the transmission data obtained through the interface unit 123 so that the transmission data is distinguished for each AC.

The transmission frame constructing unit 125 generates a frame to be transmitted. More specifically, the transmission frame constructing unit 125 generates a frame on the basis of the transmission data stored in the transmitting buffer 124 or the control information set by the control unit 130. For example, the transmission frame constructing unit 125 generates a frame (packet) from the transmission data acquired from the transmitting buffer 124 and performs a process such as addition of a media access control (MAC) header for MAC and addition of an error detection code to the generated frame.

(Control Unit)

As illustrated in FIG. 6, the control unit 130 includes a CW processing unit 131 and the transmission control unit 132.

The CW processing unit 131 functions as a setting unit, decides the CW in accordance with the priority of the AC of the transmission data, and sets the UL SU backoff counter on the basis of the CW. More specifically, the CW processing unit 131 sets the CW such that the CW decreases as the priority of the AC increases, and acquires a backoff counter which is a random number between 0 and the CW using the CW.

Then, the CW processing unit 131 decreases the UL SU backoff counter. More specifically, as long as a transmission path is detected to be in an idle state, the CW processing unit 131 decreases the UL SU backoff counter by one during the period in which the AP 200 decreases the UL MU backoff counter.

Here, the STA 100 and the AP 200 are in synchronization with each other on the basis of a reception timing of various kinds of frames (the trigger, the M-BA, the S-BA, and the like), and the CW processing unit 131 decreases the UL SU backoff counter in synchronization with the decreasing of the UL MU backoff counter by the AP 200. For example, the CW processing unit 131 decreases the UL SU backoff counter in step S1248 of FIG. 4, and suspends the decreasing of the backoff counter when the trigger is received from the AP 200 in step S1204. Then, the CW processing unit 131 restarts the decreasing of the backoff counter at a timing at which the response frame (the M-BA or the like) is received from the AP 200 or at a timing at which a reception standby time for the response frame elapses.

Then, when the backoff counter corresponding to a certain AC becomes 0, the CW processing unit 131 sets a transmission enable flag for the AC. In other words, the transmission enable flag is set for each AC, and an AC in which the data transmission using the UL SU can be performed is determined on the basis of the transmission enable flag. Here, the period in which the backoff counter is decreased for the data transmission using the UL SU is referred to as a "first waiting time."

As described above, as the priority of the AC increases, the CW decreases, and thus the backoff counter which is a random number between 0 and the CW decreases. In other words, as the priority of the transmission data increases, the waiting time of the data transmission using the UL SU decreases.

Here, the type of the AC and the priority of the AC will be described with reference to FIG. 8. FIG. 8 is a diagram illustrating the type of the AC and the priority of the AC. As illustrated in FIG. 8, in IEEE802.11, the AC is classified into four types: AC_VO (Voice); AC_VI (Video); AC_BE (Best Effort); and AC_BK (Background). A priority is assigned to each of the four types of ACs. Specifically, as illustrated in FIG. 8, the priority of AC_VO is set to be highest, and the priority of AC_BK is set to be lowest. Then, priority control is implemented by deciding the data transmission interval (the AIFS or the like) or a setting range of the CW in accordance with the priority for each AC.

The transmission control unit 132 controls the data transmission. For example, the transmission control unit 132 controls transmission of signals using the UL SU or the UL MU. To describe the data transmission using the UL SU more specifically, when the transmission data is stored in the transmitting buffer 124, the transmission control unit 132 instructs the transmission frame constructing unit 125 to generate a frame in which the transmission data is stored. Then, the transmission control unit 132 instructs the CW processing unit 131 to set the backoff counter and decrease the backoff counter. Thereafter, when information indicating that the backoff counter becomes 0 (that is, the transmission enable flag of a certain AC is set) is provided from the CW processing unit 131, the transmission control unit 132 instructs the transmission processing unit 113 to perform the data transmission using the UL SU.

Further, to describe the data transmission using the UL MU more specifically, when the transmission data is stored in the transmitting buffer 124, the transmission control unit 132 instructs the transmission frame constructing unit 125 to generate a frame in which the transmission data is stored. When information indicating that its own STA is included as the STA 100 that is permitted to perform the UL MU is provided from the received frame analyzing unit 121, the transmission control unit 132 instructs the transmission processing unit 113 to perform the data transmission using the UL MU.

2-2. Structure of AP

The configuration of the STA 100 has been described above. Next, a configuration of the AP 200 will be described with reference to FIG. 7.

FIG. 7 is a diagram illustrating the configuration of the AP 200 according to an embodiment of the present disclosure. As illustrated in FIG. 7, the AP 200 may have the same configuration as the STA 100 illustrated in FIG. 6. It will be appreciated that the AP 200 may be configured to include a component which is not installed in the STA 100. In the following description, description of components having the same functions as those of the STA 100 will be omitted.

(Wireless Communication Unit)

As illustrated in FIG. 7, a wireless communication unit 210 includes an antenna control unit 211, a reception processing unit 212, and a transmission processing unit 213. The wireless communication unit 210 functions as a communication unit. Since the reception processing unit 212 and the transmission processing unit 213 have the same functions as those in the wireless communication unit 110 of the STA 100, description thereof is omitted.

The antenna control unit 211 can perform space division multiplex communication by controlling transmission and reception of signals via a plurality of antennas. The number of antennas is arbitrary. Since the other functions of the antenna control unit 211 are the same as those of the antenna control unit 111 of the STA 100, description thereof is omitted.

(Data Processing Unit)

As illustrated in FIG. 7, a data processing unit 220 includes a received frame analyzing unit 221, a receiving buffer 222, an interface unit 223, a transmitting buffer 224, and a transmission frame constructing unit 225. Since the received frame analyzing unit 221, the receiving buffer 222, the interface unit 223, and the transmitting buffer 224 have the same functions as those in the data processing unit 120 of the STA 100, description thereof is omitted.

The transmission frame constructing unit 225 is controlled by the transmission control unit 232 and generates the trigger, the M-BA or the S-BA. For example, the transmission frame constructing unit 225 generates the trigger including the UL MU permission information provided from the transmission control unit 232. Further, the transmission frame constructing unit 225 generates the M-BA or the S-BA on the basis of the information related to the success or failure of the frame acquisition provided from the transmission control unit 232. It will be appreciated that, similarly to the transmission frame constructing unit 125 of the STA 100, the transmission frame constructing unit 225 may generate the frame including the transmission data stored in the transmitting buffer 224.

(Control Unit)

As illustrated in FIG. 7, a control unit 230 includes a CW processing unit 231 and the transmission control unit 232.

The CW processing unit 231 functions as a setting unit, decides the CW of the trigger for the UL MU, and sets the UL MU backoff counter on the basis of the CW. More specifically, the CW processing unit 231 decides the CW for transmitting the trigger including the UL MU permission information. Here, the CW processing unit 231 sets a CW smaller than the CW for the data transmission using the UL SU by the STA 100 as the CW of the trigger. Accordingly, since the UL MU backoff counter can be set to be smaller than the UL SU backoff counter, the trigger transmission for the UL MU can be performed preferentially over the data transmission using the UL SU by the STA 100. It will be appreciated that the CW processing unit 231 may set the CW which is equal to or more than the CW for the data transmission using the UL SU as the CW of the trigger.

Then, the CW processing unit 231 decreases the UL MU backoff counter. More specifically, as long as the transmission path is detected to be in the idle state, the CW processing unit 231 decreases the backoff counter by one during the period in which the STA 100 decreases the UL SU backoff counter. Here, for example, the CW processing unit 231 decreases the UL MU backoff counter in step S1328 in FIG. 5, and when the data transmitted from the STA 100c using the UL SU is received, the CW processing unit 231 suspends the decreasing of the backoff counter in step S1336. Then, after the S-BA is transmitted to the STA 100c in step S1340, the CW processing unit 231 restarts the decreasing of the backoff counter in step S1344.

Then, when the backoff counter corresponding to a certain AC becomes 0, the trigger is able to be transmitted. Here, a period in which the backoff counter is decreased for the trigger transmission for the UL MU is referred to as a "second waiting time." Since the other functions of the CW processing unit 231 are the same as those of the CW processing unit 131 of the STA 100, description thereof is omitted.

The transmission control unit 232 controls the data transmission. For example, the transmission control unit 232 controls transmission of the trigger, the M-BA, the S-BA or the data frame. To describe the transmission control of the trigger more specifically, the transmission control unit 232 provides the UL MU permission information to the transmission frame constructing unit 225 and instructs the transmission frame constructing unit 225 to generate the trigger. Then, the transmission control unit 232 instructs the CW processing unit 231 to set the backoff counter and decrease the backoff counter. Thereafter, when the information indicating that the backoff counter has become 0 is provided from the CW processing unit 231, the transmission control unit 232 instructs the transmission processing unit 213 to transmit the trigger.

Further, if the transmission control of the M-BA or the S-BA is described more specifically, when data is received in accordance with the UL MU or the UL SU, the transmission control unit 232 provides the information related to the success or failure of the frame acquisition to the transmission frame constructing unit 225 and instructs the transmission frame constructing unit 225 to generate the M-BA or the S-BA. Then, the transmission control unit 232 instructs the transmission processing unit 213 to transmit the M-BA or the S-BA.

3. Operations of Devices

The configuration of the AP 200 according to the present embodiment has been described above. Next, the data transmission operation by the STA 100 will be described with reference to FIGS. 9A and 9B. FIGS. 9A and 9B are flowcharts illustrating the data transmission operation by the STA 100.

First, when the transmission data is provided from the application or the user interface via the interface unit 123 in step S1400 (Yes in step S1400), in step S1404, the transmission data is stored in the transmitting buffer 124. In step S1408, the CW processing unit 131 acquires AC information of the transmission data, and in step S1412, the CW processing unit 131 decides the CW in accordance with the acquired priority of the AC and sets the backoff counter on the basis of the CW. When the transmission data is not provided in step S1400 (No in step S1400), the process proceeds to step S1416.

Thereafter, when the wireless transmission path is in the idle state (Yes in step S1416), after a predetermined slot time period elapses (Yes in step S1420), in step S1424, the CW processing unit 131 decreases the backoff counter. When the wireless transmission path is not in the idle state in step S1416 (No in step S1416), the process proceeds to step S1436. When the predetermined slot time period does not elapse in step S1420 (No in step S1420), the process proceeds to step S1416.

When the backoff counter corresponding to a certain AC becomes 0 (Yes in step S1428), in step S1432, the CW processing unit 131 sets the transmission enable flag for the AC. When there is no AC in which the backoff counter is 0 in step S1428 (No in step S1428), the process proceeds to step S1436.

Here, even when the backoff counter of a certain AC becomes 0, and the transmission enable flag is set for the AC, in step S1436, it is checked whether or not the trigger of the UL MU is received. Thus, when the trigger of the UL MU is received at a timing at which the backoff counter of a certain AC becomes 0, the data transmission by the UL MU can be performed preferentially over the data transmission by the UL SU.

When the wireless communication unit 110 receives the trigger from the AP 200 (Yes in step S1436), the received frame analyzing unit 121 acquires the UL MU permission information included in the trigger. Then, when its own STA is included as the STA 100 that is permitted to perform the UL MU (Yes in step S1444), the received frame analyzing unit 121 provides information indicating that its own STA is included as the STA 100 that is permitted to perform the UL MU and information used for implementation of the UL MU (a period of time in which the data transmission using the UL MU is performed, information related to a frame length in the UL MU, or the like) to the transmission control unit 132. In step S1448, the transmission control unit 132 checks the presence or absence of the transmission data of each AC in the transmitting buffer 124.

When there is transmission data (Yes in step S1448), in step S1452, the transmission control unit 132 instructs the transmission frame constructing unit 125 to generate a transmission frame. Then, after the transmission frame is generated, the transmission control unit 132 instructs the transmission processing unit 113 to perform the data transmission using the UL MU. At this time, the transmission control unit 132 provides the information used for the implementation of the UL MU to the transmission frame constructing unit 125 and the transmission processing unit 113. When its own STA is not included as the STA 100 that is permitted to perform the UL MU in step S1444 (No in step S1444), the NAV is set, and the process proceeds to step S1428.

After the data transmission using the UL MU, when the wireless communication unit 110 receives the M-BA from the AP 200 (Yes in step S1456), the received frame analyzing unit 121 acquires transmission data reception result information included in the M-BA. When information indicating that the transmission data has been correctly received by the AP 200 is included in the reception result information (step Yes in S1460), in step S1464, the transmission control unit 132 deletes the transmission data stored in the transmitting buffer 124.

Then, when it is completely checked whether all data stored in the transmitting buffer 124 has been received (Yes in step S1468), the series of data transmission processes by the STA 100 is completed. When the wireless communication unit 110 does not receive the M-BA from the AP 200 in step S1456 (No in step S1456), when information indicating that the transmission data has been received correctly in the AP 200 is not included in the reception result information in step S1460 (No in step S1460), or when it is not completely checked whether all data stored in the transmitting buffer 124 has been received in step S1468 (No in step S1468), the process proceeds to step S1400.

When the wireless communication unit 110 does not receive the trigger from the AP 200 in step S1436 (No in step S1436), the transmission control unit 132 checks whether or not there is an AC in which the transmission enable flag is set. When there is an AC in which the transmission enable flag is set (step Yes in S1476), in step S1480, the transmission control unit 132 instructs the transmission frame constructing unit 125 to generate the transmission frame using the transmission data of the AC. After the transmission frame is generated, the transmission control unit 132 instructs the transmission processing unit 113 to transmit the data transmission using the UL SU.

Thereafter, when the wireless communication unit 110 receives the S-BA from the AP 200 (Yes in step S1484), the received frame analyzing unit 121 acquires transmission data reception result information included in the S-BA. When information indicating that the transmission data has been correctly received by the AP 200 is included in the reception result information (Yes in step S1488), the process proceeds to step S1464. When there is no AC in which the transmission enable flag is set in step S1476 (step No in S1476), when the wireless communication unit 110 does not receive the S-BA from the AP 200 in step S1484 (No in step S1484), or when the information indicating that the transmission data has been correctly received by the AP 200 is not included in the reception result information in step S1488 (No in step S1488), the process proceeds to step S1400.

4. Application Examples

The data transmission operation by the STA 100 has been described above, and now application examples of the present disclosure will be described below.

The technology of the present disclosure can be applied to various products. For example, the STA 100 may be implemented as a mobile terminal such as a smartphone, a tablet personal computer (PC), a laptop PC, a portable game terminal, or a digital camera, a fixed terminal such as a television receiver, a printer, a digital scanner, or a network storage, or an in-vehicle terminal such as a car navigation apparatus. Further, the STA 100 may be implemented as a terminal that performs machine to machine (M2M) communication (also referred to as a "machine type communication (MTC) terminal") such as a smart meter, a vending machine, a remote monitoring device, or a point of sale (POS) terminal. Further, the STA 100 may be a wireless communication module mounted on any such terminal (for example, an integrated circuit module configured with one die).

On the other hand, for example, the AP 200 may be implemented as a wireless LAN access point having a router function or having no router function (also referred to as a "wireless base station"). Further, the AP 200 may be implemented as a mobile wireless LAN router. Further, the AP 200 may be a wireless communication module mounted on any such device (for example, an integrated circuit module configured with one die).

4-1. First Application Example

FIG. 10 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute wireless LAN communication. The wireless communication interface 913 can communicate with another apparatus via a wireless LAN access point in the infrastructure mode. In addition, the wireless communication interface 913 can directly communicate with another apparatus in a direct communication mode, such as an ad hoc mode, Wi-Fi Direct, or the like. In Wi-Fi Direct (registered trademark), one of two terminals operates as an access point unlike in an ad hoc mode, but communication is performed directly between the terminals. The wireless communication interface 913 can typically have a baseband processor, an radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a short-range wireless communication scheme, a proximity wireless communication scheme, or the cellular communication scheme in addition to the wireless LAN scheme. The antenna switch 914 switches a connection destination of the antenna 915 for a plurality of circuits (for example, a circuit for another wireless communication scheme) included in the wireless communication interface 913. The antenna 915 has a single or a plurality of antenna elements (for example, a plurality of antenna elements included in a MIMO antenna) and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 10. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 10 via power supply lines partially indicated by dashed lines in the drawing. The auxiliary controller 919 causes, for example, required minimum functions of the smartphone 900 to be operated in a sleep mode.

The wireless communication unit 110, the data processing unit 120, and the control unit 130 described with reference to FIG. 6 in the smartphone 900 shown in FIG. 10 may be mounted on the wireless communication interface 913. At least some of the functions may be mounted on the processor 901 or the auxiliary controller 919.

The smartphone 900 may operate as a wireless access point (software AP) when the processor 901 performs an access point function at an application level. The wireless communication interface 913 may have the wireless access point function.

4-2. Second Application Example

FIG. 11 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 11. In this case, the antenna switch 934 may be omitted from the configuration of the car navigation apparatus 920.

The battery 938 supplies electric power to each of the blocks of the car navigation apparatus 920 shown in FIG. 11 via power supply lines partially indicated by dashed lines in the drawing. In addition, the battery 938 accumulates electric power supplied from the vehicle.

The wireless communication unit 110, the data processing unit 120, and the control unit 130 described with reference to FIG. 6 in the car navigation apparatus 920 shown in FIG. 11 may be mounted on the wireless communication interface 933. At least some of the functions may be mounted on the processor 921.

Further, the wireless communication interface 933 may operate as the above-described AP 200 and may provide wireless connection to a terminal carried by a user getting in a vehicle.

Further, the technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

4-3. Third Application Example

FIG. 12 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the Internet Protocol (IP) layer and higher layers of the wireless access point 950. The memory 952 includes a RAM and a ROM and stores a program to be executed by the controller 951 and various kinds of control data (for example, a terminal list, a routing table, an encryption key, security setting, and a log).

The input device 954 includes, for example, buttons or switches and receives manipulations from a user. The display device 955 includes an LED lamp or the like and displays operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards of IEEE 802.11a, 11b, 11g, 11n, 11ac, and 11ad to provide a wireless connection to a terminal located nearby as an access point. The wireless communication interface 963 can typically have a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single antenna element or a plurality of antenna elements and is used for transmission and reception of wireless signals from the wireless communication interface 963.

The wireless communication unit 210, the data processing unit 220, and the control unit 230 described with reference to FIG. 7 in the wireless access point 950 shown in FIG. 12 may be mounted on the wireless communication interface 963. At least some of the functions may be mounted on the controller 951.

5. Conclusion

As described above, in the present embodiment, the STA 100 can perform the data transmission according to the priority of the transmission data using the UL SU regardless of the UL MU. In addition, the STA 100 does not reset the backoff counter when the data transmission using the UL SU is performed after the UL MU, and thus it is possible to prevent the data transmission from being delayed due to the resetting of the backoff counter. In other words, the STA 100 can prevent the implementation of the UL SU from being delayed due to the implementation of the UL MU. The STA 100 and the AP 200 according to the present embodiment have compatibility with the STA and the AP employing the method of the related art. For example, the STA 100 and the AP 200 according to the present embodiment can correctly communicate with both the STA and the AP that perform random access control based on CSMA/CA using the method of the related art.

It should be understood by those skilled in the art that various modifications, combinations, sub-combinations and alterations may occur depending on design requirements and other factors insofar as they are within the scope of the appended claims or the equivalents thereof.

For example, steps in the operation of the STA 100 according to the present embodiment need not necessarily be performed chronologically in accordance with the order described in the flowcharts. For example, steps in the process of the STA 100 may be performed in an order different from the order described in the flowcharts or may be performed in parallel.

Further, some components of the STA 100 may be appropriately installed outside the STA 100. Similarly, some components of the AP 200 may be appropriately installed outside the AP 200.

Further, some functions of the STA 100 may be implemented by the control unit 130. In other words, the control unit 130 may implement some functions of the wireless communication unit 110 or the data processing unit 120. Similarly, some functions of the AP 200 may be implemented by the control unit 230. In other words, the control unit 230 may implement some functions of the wireless communication unit 210 or the data processing unit 220.

Further, the effects described in this specification are merely illustrative or exemplified effects, and are not limitative. That is, with or in the place of the above effects, the technology according to an embodiment of the present disclosure may achieve other effects that are clear to those skilled in the art from the description of this specification.

Additionally, the present technology may also be configured as below.

(1) A wireless device, including
circuitry configured to
perform multi-user spatial multiplex communication and single-user communication with a communication device;
set a first waiting time for the multi-user spatial multiplex communication and a second waiting time for the single user communication;
transmit data to the communication device by the multi-user spatial multiplex communication in accordance with the first waiting time;
count the second waiting time in a period during which the first waiting time for the multi-user spatial multiplex communication is counted after transmission of the data; and
retransmit the data to the communication device by single-user communication according to the second waiting time in a case it is determined that an error occurred during the transmission of the data by the multi-user spatial multiplex communication.

(2) The wireless device according to (1), wherein
the circuitry is configured to count the first waiting time in synchronization with the second waiting time after transmission of the data.

(3) The wireless device according to any of (1) to (2), wherein the circuitry is configured to:
receive a trigger frame from the communication device; and
transmit the data using the multi-user spatial multiplex communication in a case where the wireless device is included as a permission target of the multi-user spatial multiplex communication designated by the trigger frame.

(4) The wireless device according to (3), wherein
the circuitry is configured to not reset the second waiting time which is being counted even after the data is transmitted using the multi-user spatial multiplex communication.

(5) The wireless device according to (3), wherein the circuitry is configured to:
suspend counting the second waiting time based on reception of the trigger frame; and
start reception of a response frame with respect to transmission of the data using the multi-user spatial multiplex communication or initiate counting of the second waiting time based on a lapse of a standby time for reception of the response frame.

(6) The wireless device according to any of (1) to (5), wherein
the circuitry is configured to set the second waiting time based on a priority of the data.

(7) The wireless device according to any of (1) to (6), wherein
the circuitry is configured to set the second waiting time to a time longer than the first waiting time.

(8) The wireless device according to (6), wherein
the communication device is an access point,
the wireless device is a station configured to communicate with the access point, the first waiting time and the second waiting time are backoff times that are set based on a contention window, and
the priority of the data is set in accordance with an access category.

(9) The wireless device according to any of (1) to (8), wherein
the multi-user spatial multiplex communication and the single user communication are uplink communications from the wireless device to the communication device.

(10) A method performed by a wireless device, the method including:
performing multi-user spatial multiplex communication and single user communication with a communication device;
setting a first waiting time for the multi-user spatial multiplex communication and a second waiting time for the single user communication;
transmitting data to the communication device by the multi-user spatial multiplex communication in accordance with the first waiting time;
counting the second waiting time in a period during which the first waiting time for the multi-user spatial multiplex communication is counted after transmission of the data; and
retransmitting the data to the communication device by single-user communication according to the second waiting time in a case it is determined that an error occurred during the transmission of the data by the multi-used spatial multiplex communication.

(11) A non-transitory computer-readable medium including computer-program instructions, which when executed by a wireless device, cause the wireless device to:
perform multi-user spatial multiplex communication and single-user communication with a communication device;
set a first waiting time for the multi-user spatial multiplex communication and a second waiting time for the single user communication;
transmit data to the communication device by the multi-user spatial multiplex communication in accordance with the first waiting time;
count the second waiting time in a period during which the first waiting time for the multi-user spatial multiplex communication is counted after transmission of the data; and
retransmit the data to the communication device by single-user communication according to the second waiting time in a case it is determined that an error occurred during the transmission of the data by the multi-used spatial multiplex communication.

(12) A communication device, including:
circuitry configured to perform multi-user spatial multiplex communication and single user communication with a wireless device;

set a first waiting time for the single user communication and a second waiting time for the multi-user spatial multiplex communication;

count the second waiting time in a period in which a first waiting time for the single user communication is counted after performing single user communication with the wireless device; and transmit a trigger frame including permission information for the multi-user spatial multiplex communication to the wireless device after the second waiting time expires.

(13) The communication device according to (12), wherein the circuitry is configured to:

receive data from the wireless device through the multi-user spatial multiplex communication in response to the trigger frame;

generate a response frame for the multi-user spatial multiplex communication based on reception of the data through the multi-user spatial multiplex communication; and transmit the response frame for the multi-user spatial multiplex communication to the wireless device.

(14) The communication device according to any of (12) to (13), wherein the circuitry is configured to:

receive data from the wireless device through the single user communication;

generate a response frame for the single user communication based on reception of the data through the single user communication; and transmit the response frame for the single user communication to the wireless device.

(15) The communication device according to (14), wherein the circuitry is configured to:

suspend counting the second waiting time based on the reception of the data through the single user communication; and start counting the second waiting time based on transmission of the response frame for the single user communication.

(16) The communication device according to any of (12) to (15), wherein the communication device is an access point device, the wireless device is a station device configured to communicate with the access point, and the first waiting time and the second waiting time are backoff times that are set based on a contention window.

(17) The communication device according to any of (12) to (17), wherein the multi-user spatial multiplex communication and the single user communication are uplink communications from the wireless device to the communication device.

(18) A method performed by a communication device, the method including:

performing multi-user spatial multiplex communication and single user communication with a wireless device;

setting a first waiting time for the single user communication and a second waiting time for the multi-user spatial multiplex communication;

counting the second waiting time in a period in which a first waiting time for the single user communication is counted after performing single user communication with the wireless device; and transmitting a trigger frame including permission information for the multi-user spatial multiplex communication to the wireless device after the second waiting time expires.

(19) A non-transitory computer-readable medium including computer-program instructions, which when executed by a wireless device, cause the wireless device to:

perform multi-user spatial multiplex communication and single user communication with a wireless device;

set a first waiting time for the single user communication and a second waiting time for the multi-user spatial multiplex communication;

count the second waiting time in a period in which a first waiting time for the single user communication is counted after performing single user communication with the wireless device; and transmit a trigger frame including permission information for the multi-user spatial multiplex communication to the wireless device after the second waiting time expires.

REFERENCE SIGNS LIST

10 BSS
100 STA
110 wireless communication unit
120 data processing unit
130 control unit
200 AP
210 wireless communication unit
220 data processing unit
230 control unit

The invention claimed is:

1. A wireless device, comprising:
  circuitry configured to perform multi-user spatial multiplex communication and single-user communication with a communication device;
  set a first waiting time for the single user communication;
  count the first waiting time in a period in which a second waiting time for the multi-user spatial multiplex communication is counted;
  receive, from the communication device, a trigger frame causing transmission of data using the multi-user spatial multiplex communication;
  suspend counting the first waiting time in response to receiving the trigger frame;
  restart to count the suspended first waiting time without resetting the first waiting time, based on a lapse of time for reception of a response frame from the communication device, wherein the response frame is responded to transmission of the data using the multi-user multiplex communication caused by the trigger frame; and
  transmit the data to the communication device by the single-user communication after the first waiting time expired.

2. The wireless device according to claim 1, wherein the circuitry is configured to transmit the data using the multi-user spatial multiplex communication in a case where the wireless device is included as a permission target of the multi-user spatial multiplex communication designated by the trigger.

3. The wireless device according to claim 1, wherein the circuitry is configured to:
  transmit the data using the multi-user spatial multiplex communication in a case where the wireless device is included as a permission target of the multi-user spatial multiplex communication designated by the trigger frame.

4. The wireless device according to claim 1, wherein the circuitry is configured to set the second waiting time based on a priority of the data.

5. The wireless device according to claim 4, wherein the communication device is an access point, the wireless device is a station configured to communicate with the access point, the first waiting time and the second waiting time are backoff times that are set based on a contention window, and the priority of the data is set in accordance with an access category.

6. The wireless device according to claim 1, wherein the circuitry is configured to set the second waiting time to a time longer than the first waiting time.

7. The wireless device according to claim 1, wherein the multi-user spatial multiplex communication and the single user communication are uplink communications from the wireless device to the communication device.

8. A method performed by a wireless device, the method comprising:
- performing multi-user spatial multiplex communication and single user communication with a communication device;
- setting a first waiting time for the single user communication;
- counting the first waiting time in a period in which a second waiting time for the multi-user spatial multiplex communication is counted;
- receiving, from the communication device, a trigger frame causing transmission of data using the multi-user spatial multiplex communication;
- suspending counting the first waiting time in response to receiving the trigger frame;
- restarting to count the suspended first waiting time without resetting the first waiting time, based on a lapse of a time for reception of a response frame from the communication device, wherein the response frame is responded to transmission of the data using the multi-user spatial multiplex communication caused by the trigger frame; and
- transmitting the data to the communication device by the single-user communication after the first waiting time expired.

9. A non-transitory computer-readable medium including computer-program instructions, which when executed by a wireless device, cause the wireless device to:
- perform multi-user spatial multiplex communication and single-user communication with a communication device;
- set a first waiting time for the single user communication;
- count the first waiting time in a period in which a second waiting time for the multi-user spatial multiplex communication is counted;
- receive, from the communication device, a trigger frame causing transmission of data using the multi-user spatial multiplex communication;
- suspend counting the first waiting time in response to receiving the trigger frame;
- restart to count the suspended first waiting time without resetting the first waiting time, based on a lapse of a time for reception of a response frame from the communication device, wherein the response frame is responded to transmission of the data using the multi-user spatial multiplex communication caused by the trigger frame; and
- transmit the data to the communication device by the single-user communication after the first waiting time expired.

* * * * *